United States Patent
Balinsky et al.

(10) Patent No.: US 10,949,146 B2
(45) Date of Patent: Mar. 16, 2021

(54) DOCUMENT OPERATION COMPLIANCE

(71) Applicant: Hewlett-Packard Development Company, L.P., Houston, TX (US)

(72) Inventors: Helen Balinsky, Cardiff (GB); Scott White, Boise, ID (US); Shivaun Albright, Rocklin, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/079,661

(22) PCT Filed: Jun. 21, 2016

(86) PCT No.: PCT/US2016/038507
§ 371 (c)(1),
(2) Date: Aug. 24, 2018

(87) PCT Pub. No.: WO2017/222504
PCT Pub. Date: Dec. 28, 2017

(65) Prior Publication Data
US 2019/0056897 A1    Feb. 21, 2019

(51) Int. Cl.
| | | |
|---|---|---|
| *G06F 3/12* | (2006.01) | |
| *G06F 21/62* | (2013.01) | |
| *G06F 21/64* | (2013.01) | |
| *G06K 15/00* | (2006.01) | |
| *G06F 21/85* | (2013.01) | |
| *G06K 15/02* | (2006.01) | |
| *G06F 21/60* | (2013.01) | |
| *H04L 9/30* | (2006.01) | |
| *H04L 9/32* | (2006.01) | |

(52) U.S. Cl.
CPC ............ *G06F 3/1238* (2013.01); *G06F 3/126* (2013.01); *G06F 3/1222* (2013.01); *G06F 3/1276* (2013.01); *G06F 21/602* (2013.01); *G06F 21/85* (2013.01); *G06K 15/1856* (2013.01); *G06K 15/4095* (2013.01); *H04L 9/30* (2013.01); *H04L 9/3247* (2013.01)

(58) Field of Classification Search
USPC ................................ 358/1.1–3.29, 1.11–1.18
See application file for complete search history.

(56) References Cited

U.S. PATENT DOCUMENTS

| | | | |
|---|---|---|---|
| 7,339,691 B2 | 3/2008 | Ferlitsch | |
| 7,729,001 B2 | 6/2010 | Perronnin | |
| 8,289,538 B2 | 10/2012 | Cyman, Jr. et al. | |
| 8,446,607 B2 * | 5/2013 | Zucker ................ | G06F 21/6281 358/1.14 |

(Continued)

OTHER PUBLICATIONS

DeviceLock, Inc., "Group Policy-Integrated Endpoint Data Leak Prevention (DLP) Suite for Protecting Sensitive Information", http://www.thksolutions.com/, Oct. 22, 2013, 8 pgs.

*Primary Examiner* — Marcellus J Augustin
(74) *Attorney, Agent, or Firm* — HP Inc. Patent Department

(57) ABSTRACT

Examples disclosed herein relate to receiving a request to perform an operation on a document, determining whether the document complies with a plurality of operation policies, and in response to determining that the document complies with the plurality of operation policies, providing a notification that the operation is ready to be performed and digitally signing the document.

10 Claims, 3 Drawing Sheets

(56) References Cited

U.S. PATENT DOCUMENTS

| | | | | |
|---|---|---|---|---|
| 8,699,053 B2* | 4/2014 | Hoover | .................. | G06F 3/1269 |
| | | | | 358/1.15 |
| 9,014,489 B2 | 4/2015 | Berger et al. | | |
| 9,367,776 B2* | 6/2016 | Ulichney | ............... | G06F 21/608 |
| 2003/0137690 A1* | 7/2003 | Hoover | .................. | G06F 3/1204 |
| | | | | 358/1.15 |
| 2003/0182475 A1 | 9/2003 | Gimenez | | |
| 2004/0184064 A1* | 9/2004 | TaKeda | .................. | G06F 21/608 |
| | | | | 358/1.13 |
| 2005/0174559 A1* | 8/2005 | Teneze | ............... | H04B 10/1121 |
| | | | | 356/5.01 |
| 2005/0289346 A1* | 12/2005 | Minagawa | ............ | G06F 21/608 |
| | | | | 713/171 |
| 2007/0208665 A1* | 9/2007 | Ohara | ..................... | G06Q 10/00 |
| | | | | 705/51 |
| 2008/0273224 A1* | 11/2008 | Maulsby | ................. | G06Q 10/10 |
| | | | | 358/1.15 |
| 2009/0320127 A1* | 12/2009 | Hong | ................. | H04N 1/00846 |
| | | | | 726/21 |
| 2010/0060925 A1* | 3/2010 | Thomas | ................. | G06F 21/608 |
| | | | | 358/1.15 |
| 2011/0040983 A1* | 2/2011 | Grzymala-Busse | ......................... | |
| | | | | G06F 21/6245 |
| | | | | 713/189 |
| 2014/0002845 A1* | 1/2014 | Gutnik | ................... | G06F 3/1247 |
| | | | | 358/1.14 |
| 2014/0211242 A1* | 7/2014 | Stone | .................... | G06F 3/1222 |
| | | | | 358/1.15 |
| 2014/0233055 A1 | 8/2014 | Eizenberg et al. | | |

\* cited by examiner

DOCUMENT OPERATION COMPLIANCE

BACKGROUND

Users often desire to print documents at a printing device. Typically, printer drivers convert the document data to a form specific to each printer, such that applications need not be aware of the technical details of each printer model. Modern operating systems often support both model-specific print drivers for individual printers and universal print drivers that may be capable of converting data to printer specific formats for a multitude of printer models.

BRIEF DESCRIPTION OF THE DRAWINGS

In the accompanying drawings, like numerals refer to like components or blocks. The following detailed description references the drawings, wherein.

DETAILED DESCRIPTION

Figure 1:
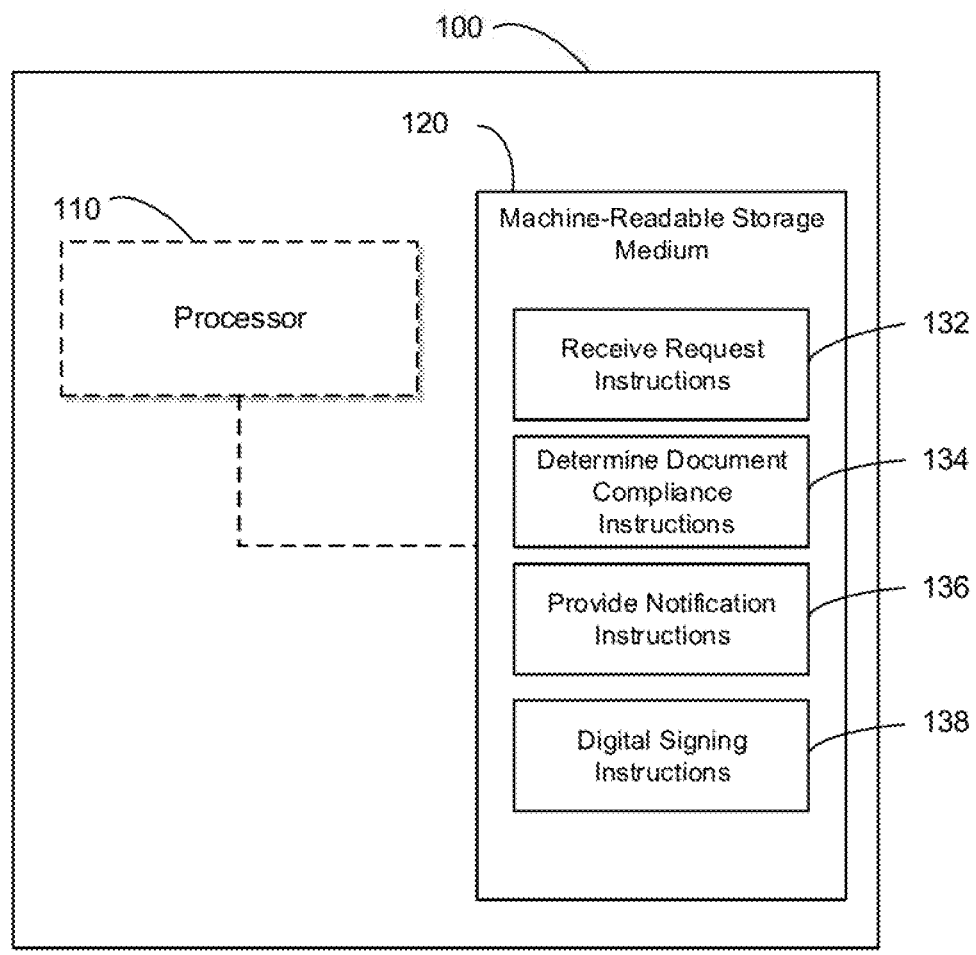
FIG. 1 is a block diagram of an example document operation compliance device.

Printer drivers convert data-to-be-printed, such as documents, spreadsheets, etc. to a form specific to a given printer, thus allowing applications to print without being aware of the technical details of each printer model. As a result, a print driver presents a unique non-bypassable and reliable checkpoint that each and every print job unavoidably goes through.

In some situations, sensitive documents should be prevented from being printed and/or logs should be kept when certain data is printed. For example, medical records may need to be printed in a doctor's office but an audit log should be maintained for compliance with privacy and/or other regulations. For another example, a document containing confidential financial information should be prevented from printing on a publicly accessible printer and/or prevented from printing at all. Documents may comprise, for example, text, images, graphics, metadata (e.g., non-visible data associated with the document such as author, time/date information, owner, policy information, etc.). Any and/or all of these document parts may be subject to security policies. A policy comprises a policy condition (e.g., a "confidential" watermark) and a policy action (e.g., forbid the document from being printed). In some examples, documents may comprise text embedded in images and/or graphics; this text may be captured through the use of techniques such as pattern recognition and/or Optical Character Recognition (OCR) and textual analysis may be applied.

In some implementations, documents may be evaluated using various machine learning techniques, where a policy may comprise "belonging to a particular class" as its condition. Different policy conditions may be combined, e.g. belonging to a class of "Firmware" and containing keywords "mfp" and "technical documentation". Other policy conditions may restrict the fulfillment of a print job on some devices rather than forbid it entirely, such as "allow printing of a document comprising a keyword "confidential" only on printer123 during working hours 9 am-5 pm". Policies may also depend on external factors to the document, such as who the user is and/or which device is intended for print.

A dedicated and/or universal print driver may be installed on a computing device, thereby representing a point where all digital content is sent to hardcopy devices from the computing device. Print jobs may be analyzed by the print driver and/or by a service/application in communication with the print driver before allowing them to be sent to a printer. For example, the print driver may send print jobs to a service, such as a data leakage prevention (DLP) service, for analysis and block those jobs that DLP service finds to contain confidential or sensitive content and/or otherwise be in a breach of set policies. Thus, each and every print job originating from a computing device with the DLP-enabled print driver, may be captured, analyzed and routed accordingly. Print jobs may be captured prior leaving a computing device on their route to a printer.

In some implementations, timely feedback to a user may be provided as well, ensuring that the user is not left wondering on whereabouts and/or status of a submitted print job. For example, the DLP service may receive each job from the print driver, analyze the job, make a determination on the compliance with a set of policies, and inform the user of the result before the job is ever transmitted to a print device.

Various implementations may be used to provide a DLP solution. For example, a print driver may receive a print job and provide it to the DLP service. The driver may then poll and/or contact the service to determine the status of the job (e.g., Waiting, Rejected, Approved, Submitted to Device, Ready to be Pulled, Printed, etc.).

For another example, the print driver may submit a copy of a print job, while retaining another copy in a print queue. As in the prior example, the driver may poll and/or contact the DLP-service for the job status. For Approved jobs, the DLP service may release a digital signature of the job. The DLP service may also communicate extra requirements, such as mandatory encryption of a job prior submission to a device. For Rejected jobs, the print driver may discard the print job from the queue and communicate the job status to the job owner. For Approved jobs, the digital signature of the job may be appended/prepended to the print job in the queue and the job may be submitted to the printer.

In another example, the print driver may upload a job to a DLP service and await a decision by periodically polling and/or otherwise communicating with the DLP-service to retrieve the job status. If the job is rejected, the driver may communicate the decision to the job owner, such as via a message displayed on a user interface device associated with a job owner's computing device. If the job is approved, the driver may download the entire print job, signed by the DLP service, and submit it to the printing device. Once an Approved job is received, the driver may keep the job in a ready-to-print state until the actual printing is requested by the job's owner; the job does not need to be submitted to a printer immediately.

In some embodiments, the print driver may maintain a list of DLP policies without the use of a separate service. The driver may evaluate each job as it is received and provide the approval and/or rejection as well as digitally signing the job, if required, prior to delivering the job to a printing device. The driver and/or DLP service in each implementation may also maintain an audit log of evaluated jobs, such as recording job names, descriptions, and/or users of any rejected and/or approved jobs. The audit log may also identify any policies violated that resulted in a rejection of the job.

FIG. 1 is a block diagram of an example document operation compliance device 100 consistent with disclosed implementations. Document operation compliance device 100 may comprise a processor 110 and a non-transitory machine-readable storage medium 120. Document operation compliance device 100 may comprise a computing device such as a server computer, a desktop computer, a laptop computer, a handheld computing device, a smart phone, a tablet computing device, a mobile phone, a network device (e.g., a switch and/or router), a peripheral device, a printing device, or the like.

Processor 110 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 120. In particular, processor 110 may fetch, decode, and execute a plurality of receive request instructions 132, determine document compliance instructions 134, provide notification instructions 136, and digital signing instructions 138.

Executable instructions may comprise logic stored in any portion and/or component of machine-readable storage medium 120 and executable by processor 110. The machine-readable storage medium 120 may comprise both volatile and/or nonvolatile memory and data storage components. Volatile components are those that do not retain data values upon loss of power. Nonvolatile components are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive request instructions 132 may receive a request to perform an operation on a document. For example, a driver associated with a printer, scanner, copier, and/or multifunction device may receive a request to scan, copy, and/or print a document. The request may be automatically generated and/or in response to a user input to device 100, such as by selecting a "print" option from a menu in an application.

Determine document compliance instructions 134 may determine whether the document complies with a plurality of security policies. For example, certain types of data, such as personally identifiable data, may be restricted from being printed and/or copied. Such restrictions may be incorporated into security policy rules that may specify the type of data to be restricted, which device(s) the rule applies to, user credentials that may be needed and/or permitted to perform operations on documents comprising the restricted data, etc. For example, a document comprising employee salary information may be prohibited from being printed except on a specific printing device (e.g., a device associated with a human resources department) and/or except by certain users (e.g., an employee's manager or HR personnel). Other policies may restrict data based on contextual analysis of the text (e.g., competitive intelligence may be identified by company names and/or known codenames) and/or image analysis (e.g., looking for "confidential" watermarks).

In some implementations, determine document compliance instructions 134 may be performed, for example, by a driver associated with the printer and/or by a compliance application/service, such as a Data Leakage Prevention (DLP) service. The device driver may receive the request and trigger a compliance check of the security policies for each operation and/or for operations associated with certain users and/or devices. The driver may analyze the document directly and/or may provide the document to a separate DLP service. In some implementations, the driver may maintain the document in a queue and provide a copy of the document to the DLP service. The original document may remain in the queue until an approval is received, either automatically or after requesting and/or polling the DLP service. If an approval is not received within a configurable time period, or a rejection is received from the DLP service, the document may be deleted from the queue.

Determine document compliance instructions 134 may further comprise instructions to analyze a content of the document for a security violation and/or to analyze an image of the document for a security restriction. For example, the text of a document to be printed may be scanned for keywords and/or arrangements of content. For scanning and/or copying operations, the paper document may be scanned into memory and an optical character recognition process may be performed to render the scanned text parseable by a DLP service and/or driver. The digital copy of the document may not be released for copying and/or to a scanned file until an approval is received from the DLP service. Image analysis may look for specific images (e.g., a "confidential" watermark and/or "do not copy" stamp) and/or metadata associated with images, such as copyright information and/or "do not reproduce" tags. In some implementations, the DLP service may apply machine learning based document classification. For example, a document may be processed via Optical Character Recognition (OCR) prior to applying text analysis, scanning for keywords and/or combinations of keywords, as well as machine learning text based document classifications, such as supervised machine learning, where belonging/not belonging of a document to a particular class is considered an input into the policy conditions.

Provide notification instructions 136 may provide a notification that the operation is ready to be performed. For example, a user may be notified via a message window in a user interface that the document has been approved or rejected and whether the operation may continue (e.g., if the document is approved). A user may be provided with the information that a job is rejected for fulfillment on the original device, but may be approved for fulfillment on a different device, such as a dedicated printer for jobs of a certain type, classification, etc. In some implementations, the operation may then wait on the user to confirm completion of the operation. In other operations, the notification may indicate which device has completed and/or is in process of completing the operation. For another example, the user may receive an e-mail, text message, or application alert, such as via a mobile app on a smartphone. Such an app may allow the user to instruct the device to complete the operation at a time convenient to the user, such as while the user is walking over to the specific device.

Digital signing instructions 138 may digitally sign the document. For example, once the document has been determined to comply with the security polices, the driver and/or DLP service may digitally sign the document to certify such compliance. In some implementations, a device driver may be configured to forbid completion of various operations (e.g., print, scan, copy, etc.) by the device of any document that has not been digitally signed. In some implementations, a timestamp may be associated with the signature that provides a time constraint on how long the document operation may be completed before needing to be resubmitted for compliance verification.

Digital signing instructions 138 may further comprise instructions to digitally sign the document with a public key associated with a device to perform the operation, such as where the operation comprises printing the document and the device comprises a printer. For example, the DLP service may sign the document using a private signature key, owned by DLP service. A corresponding public key certificate may be available (e.g., via a trusted certificate authority) and/or given to a device to validate the signature prior to printing the document.

Digital signing instructions 138 may further comprise instructions to perform a translation of the document to a printer-specific format. For example, the document may be translated from an application format (e.g., Word® or PDF® document) to a printer format, such as Printer Command Language (PCL), PostScirpt (PS), etc. The translated form of the document may then be signed prior to completion of the operation.

In some implementations, the DLP service may a) validate a document in its original format, then translate it to a printer recognizable format and then apply a digital signature to certify that the document may be printed, b) translate the document into a printer recognizable format, then validate the document and apply the digital signature, if approved, and/or c) receive the document in printer-recognizable format, then validate the document and then apply signature (if approved). In some implementations, the printer may accept a signed version of an approved document in its original form, validate the signature, and translate the signed document into the device-specific and/or printer-recognizable form prior to completion of the print job.

Figure 2:
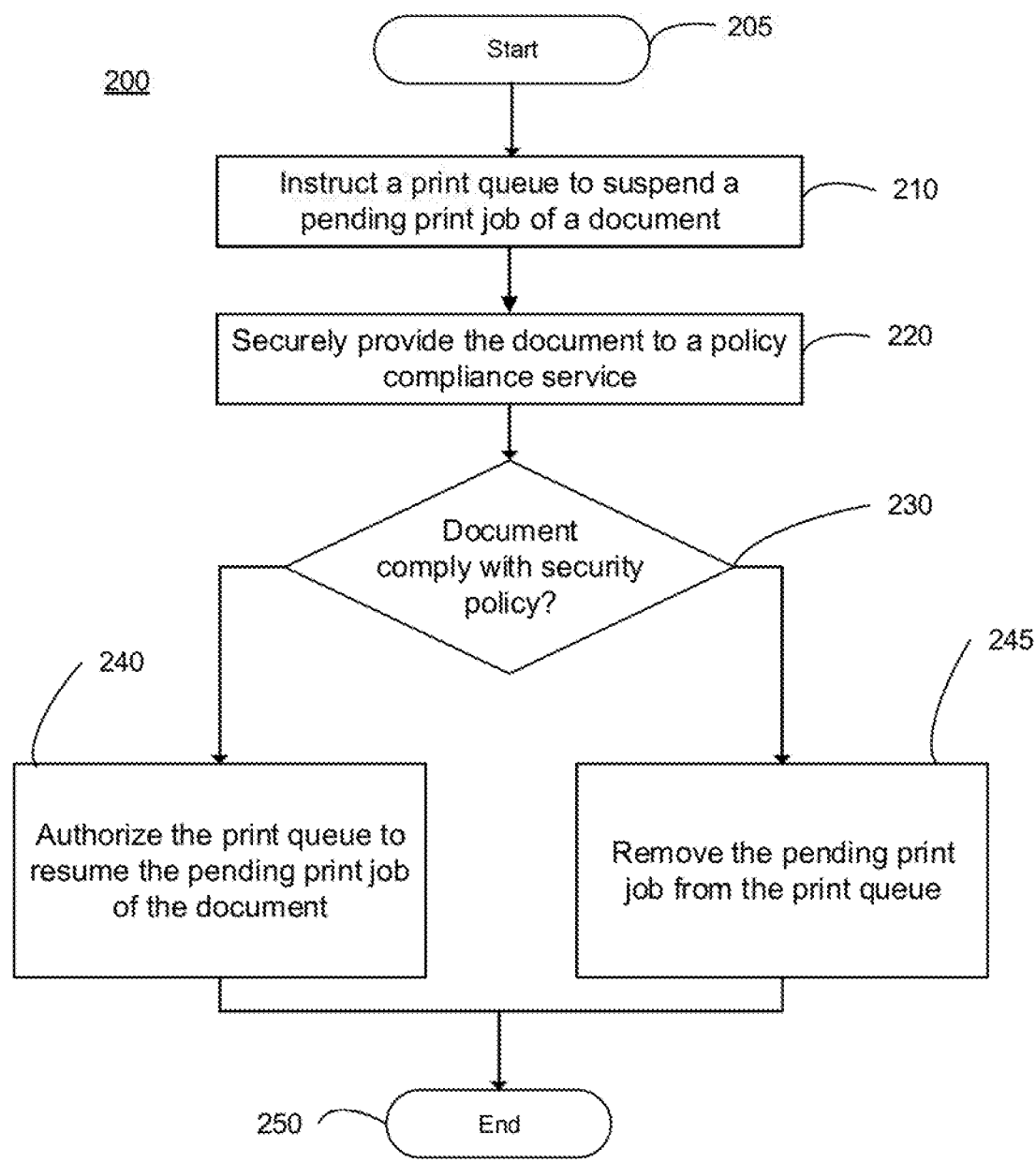
FIG. 2 is a flowchart of an example of a method for providing document operation compliance.

FIG. 2 is a flowchart of an example method 200 for providing document operation compliance consistent with disclosed implementations. Although execution of method 200 is described below with reference to device 100, other suitable components for execution of method 200 may be used.

Method 200 may begin in stage 205 and proceed to stage 210 where device 100 may instruct a print queue to suspend a pending print job of a document. For example, a document may be received from an application, such as a word processing application, by a print driver for processing. Documents may normally be placed into a print queue to be printed in order. In some implementations, the document may be prevented from being transformed by the print driver into a device specific format and/or from being printed by the device until a determination is made on whether the document complies with a security policy and/or a plurality of security policies.

Method 200 may then advance to stage 220 where device 100 may securely provide the document to a policy compliance service. For example, the policy compliance service, also referred to herein as a DLP service, may comprise a component of the print driver and/or a separate service. Securely providing the document to the service may comprise using a secured communication channel, such as a corporate intranet and/or a virtual private network (VPN), using a secure memory segment shared by the print driver and the service, and/or encryption of the document prior to transmission of the document check to the DLP service. The DLP service, upon approving a document for printing, may encrypt it using hybrid encryption with the printing device's public key, so the document can only be accessed on the authorized device. This arrangement may be used in some policy rules associated with highly sensitive documents, where there is a risk of a document being taken to an unauthorized printer that does not support a DLP signature. The encryption limits accessibility of a job to specified printer/s only, which will decrypt the job and validate the approval signature prior to processing the job.

Method 200 may then advance to stage 230 where device 100 may determine whether the document complies with at least one security policy. For example, the policy compliance service, which may comprise part of a printer driver and/or a separate DLP service/application, may analyze content of the document with respect to configurable policy rules. In some implementations, determine document compliance instructions 134 may determine whether the document complies with a plurality of security policies. For example, certain types of data, such as personally identifiable data, may be restricted from being printed and/or copied. Such restrictions may be incorporated into security policy rules that may specify the type of data to be restricted, which device(s) the rule applies to, user credentials that may be needed and/or permitted to perform operations on documents comprising the restricted data, etc. For example, a document comprising employee salary information may be prohibited from being printed except on a specific printing device (e.g., a device associated with a human resources department) and/or except by certain users (e.g., an employee's manager or HR personnel). Other policies may restrict data based on contextual analysis of the text (e.g., competitive intelligence may be identified by company names and/or known codenames, supervised machine learning classification) and/or image analysis (e.g., looking for "confidential" watermarks, specific image classes such as diagrams, maps, etc.).

In some implementations, determine document compliance instructions 134 may be performed, for example, by a driver associated with the printer and/or by a compliance application/service, such as a Data Leakage Prevention (DLP) service. The device driver may receive the request and trigger a compliance check of the security policies for each operation and/or for operations associated with certain users and/or devices. The driver may analyze the document directly (locally) and/or may provide the document to a separate DLP service. In some implementations, the driver may maintain the document in a queue and provide a copy of the document to the DLP service. The original document may remain in the queue until an approval is received, either automatically or after requesting and/or polling the DLP service. If an approval is not received within a configurable time period, or a rejection is received from the DLP service, the document may be deleted from the queue.

Determine document compliance instructions 134 may further comprise instructions to analyze a content of the document for a security violation and/or to analyze an image of the document for a security restriction or other policy conditions. For example, the text of a document to be printed may be scanned for keywords and/or arrangements of content. For scanning and/or copying operations, the paper document may be scanned into memory and an optical character recognition process may be performed to render the scanned text parseable by a DLP service and/or driver. The digital copy of the document may not be released for copying and/or to a scanned file until an approval is received from the DLP service. Image analysis may look for specific images (e.g., a "confidential" watermark and/or "do not copy" stamp) and or image types/classes (e.g. product blueprint diagrams and schematics, maps, business/legal flow charts) and/or metadata associated with images, such as copyright information and/or "do not reproduce" tags.

In some implementations, determining whether the document complies with at least one security policy may comprise determining whether the document violates a second security policy of a plurality of security policies. For example, a first security policy violation may require only that an audit log about the print job be created, while a second security policy violation may require that the print job be halted. Such policies may be enforced independently and/or in a tiered or weighted manner. A tiered approach, for example, might require that a violation of any single policy results in a warning message, a violation of two policies requires an audit log entry, and a violation of three policies would result in the print job being rejected. A weighted approach may assign a security score to each of the policies, with each policy violation adding its score to a total score for the print job. Different score values may result in differing actions such as rejection, logging, warning messages, or simply approving. These scores may be assigned during the initial configuration of the policies and/or updated as needed.

In response to determining that the document complies with the at least one security policy, method 200 may advance to stage 240 where device 100 may authorize the print queue to resume the pending print job of the document. In some implementations, authorizing the print queue to resume the pending print job of the document may comprise digitally signing the document, such as by digitally signing the document with a public key of a print device associated with the print queue.

In some implementations, the print driver may periodically poll the DLP service for decisions on pending documents, and retrieve the digital signatures and/or digitally signed copies of the document(s) to be printed. Such signatures may allow the document to resume processing in the print queue and be printed. In some implementations, wherein the DLP service comprises a component of the driver, an inter-process message may suffice to allow the document to resume processing in the print queue and be printed.

In response to determining that the document does not comply with the at least one security policy, method 200 may advance to stage 245 where device 100 may remove the pending print job from the print queue. In some implementations, the print driver may periodically poll the DLP service for decisions on pending documents, and remove any documents from the queue found to be in violation of the security policy and/or policies.

After authorizing the print queue to resume the pending print job at stage 240 or removing the pending print job at stage 245, method 200 may end at stage 250.

Figure 3:
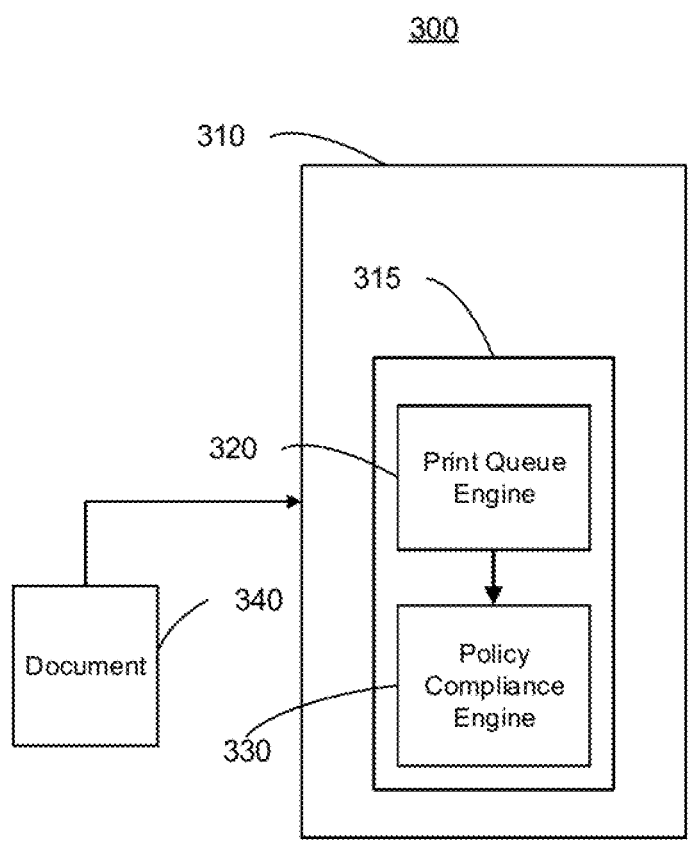
FIG. 3 is a block diagram of an example system for providing document operation compliance.

FIG. 3 is a block diagram of an example system 300 for providing document operation compliance. System 300 may comprise a computing device 310 comprising a memory 315, a print queue engine 320, and a policy compliance engine 330. Engines 320, 330 may be associated with a single computing device 310 and/or may be communicatively coupled among different devices such as via a direct connection, bus, or network. Each of engines 320, 330 may comprise hardware and/or software associated with computing devices. In some implementations, computing device 310 may also comprise a communicatively coupled printing device.

Print queue engine 320 may receive a request to print a document 340 on a printing device 350 and provide a copy of the document to a policy compliance engine 330. Policy compliance engine 330 may comprise a DLP service configured to analyze a document for compliance with security policy rule(s).

Policy compliance engine 330 may determine whether the document complies with at least one security policy and, in response to determining that the document complies with the at least one security policy, digitally sign the document. In response to determining that the document does not comply with the at least one security policy, policy compliance engine 330 may instruct the print queue engine to discard the document and create an audit log record associated with the request to print the document.

The disclosed examples may include systems, devices, computer-readable storage media, and methods for document operation compliance. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions to:
   receive, by a universal print driver running on a computing device and through which all digital content is sent to printing devices from the computing device for printing, a request to print a document;
   determine, by the universal print driver, whether the document complies with a plurality of operation policies;
   in response to determining that the document complies with the plurality of operation policies:
      digitally sign, by the universal print driver, the document with a private key of the universal print driver prior to printing of the document; and
   in response to determining that the document does not comply with the plurality of operation policies:
      discard the document, and create an audit log record associated with the request to print the document.

2. The non-transitory machine-readable medium of claim 1, wherein the instructions to digitally sign the document further comprise instructions to digitally encrypt the document with a public key associated with a printing device to print the document.

3. The non-transitory machine-readable medium of claim 1, wherein the instructions to determine whether the document complies with the plurality of operation policies comprise instructions to analyze a content of the document for a security violation.

4. The non-transitory machine-readable medium of claim 1, wherein the instructions to determine whether the document complies with the plurality of operation policies comprise instructions to analyze an image of the document for a security restriction.

5. The non-transitory machine-readable medium of claim 4, wherein the instructions to digitally sign the document comprise instructions to perform a translation of the document to a printer-specific format.

6. A computer-implemented method, comprising:
   suspending, by a universal print driver running on a computing device and through which all digital content is sent to printing devices from the computing device for printing, a pending print job of a document within a print queue;
   securely providing, by the universal print driver, the document to a policy compliance service;
   receiving, by the universal print driver, a determination from the policy compliance service that the document complies with at least one security policy;
   in response to determining that the document complies with the at least one security policy, resuming, by the universal print driver, the pending print job of the document within the print queue, including digitally signing the document with a private key of the universal print driver prior to printing of the document;
   in response to determining that the document does not comply with the at least one security policy, discarding, by the universal print driver, the pending print job of the document from the print queue, and creating an audit log record associated with a request to print the document.

7. The computer-implemented method of claim 6, wherein the at least one security policy comprises one of a plurality of security policies.

8. The computer-implemented method of claim 7, wherein the determination that the document complies with the at least one security policy comprises a determination that the document satisfies a second security policy.

9. The computer-implemented method of claim 7, wherein the determination that the document complies with the at least one security policy comprises a determination that the document satisfies a subset of the plurality of security policies, wherein each of the plurality of security policies comprises a security score.

10. A computing device comprising:
    a processor; and
    a memory storing program code executable by the processor to implement a universal print driver running on a computing device and through which all digital content is sent to printing devices from the computing device for printing,
    wherein the universal print driver is to:
      receive a request to print a document on a printing device;
      provide a copy of the document to a policy compliance engine;
      receive a determination whether the document complies with at least one security policy;
      in response to determining that the document complies with the at least one security policy, digitally sign the document with a private key of the universal print driver prior to printing of the document; and
      in response to determining that the document does not comply with the at least one security policy:
        instruct the print queue engine to discard the document, and
        create an audit log record associated with the request to print the document.

* * * * *